United States Patent Office 3,474,097
Patented Oct. 21, 1969

1

3,474,097
PREPARATION OF QUINOXALINE-
N,N'-DIOXIDES
James David Johnston, Old Saybrook, Conn., assignor to
Chas. Pfizer & Co., Inc., New York, N.Y., a corporation of Delaware
No Drawing. Filed Apr. 3, 1967, Ser. No. 627,616
Int. Cl. C07d 51/78
U.S. Cl. 260—250    8 Claims

ABSTRACT OF THE DISCLOSURE

The cumulative, continuous flow preparation of quinoxaline-N,N'-dioxides by halogenation of ketones, followed by condensation with o-phenylenediamine and oxidation of the resulting dihydroquinoxaline results in an overall yield higher than that obtained by the corresponding stepwise process. The products of the process are useful as antibacterial agents and as chemical intermediates.

Background of the invention

This invention relates to a process for the preparation of quinoxaline-N,N'-dioxides, and in particular to an improved cumulative, continuous flow process for the preparation thereof.

It was previously known that oxidation of a dihydroquinoxaline with peroxycarboxylic acids results in the formation of the corresponding quinoxaline-N,N'-dioxide. It was further known that said dihydroquinoxaline could be synthesized by condensation of o-phenylenediamine and an appropriate α-haloketone, the latter in turn, being synthesized by halogenation of the corresponding ketone. However, synthesis of quinoxaline-N,N'-dioxides by this route has heretofore required the isolation of several intermediates, viz., the α-haloketone and either the dihydroquinoxaline or the quinoxaline, with each isolation step resulting in loss of material.

It has now been discovered that the individual steps of this synthetic route can be made mutually compatible to permit one to conduct the process in a cumulative, continuous flow manner, thereby avoiding the difficulties and disadvantages previously encountered. Thus, the instant invention provides a desirable and advantageous method for the preparation of quinoxaline-N,N'-dioxides, fully competitive with other methods. This is in contrast with the prior art, which teaches that this process, conducted in a stepwise manner, is inadequate and of only academic interest. See R. C. Elderfield, Heterocyclic Compounds, vol. 6, p. 461.

Summary of the invention

This invention is the improvement in the process for the preparation of quinoxaline-N,N'-dioxides from α-haloketones, which comprises conducting, as a cumulative, continuous flow procedure, the steps of:

(1) Reacting, under monohalogenation conditions, a ketone of the formula

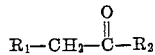

wherein $R_1$ is selected from the group consisting of hydrogen and alkyl containing from 1 up to 5 carbon atoms, $R_2$ is selected from the group consisting of alkyl containing from 1 up to 6 carbon atoms, phenyl, benzyl and β-phenylethyl and $R_1$ and $R_2$, taken together, are polymethylene containing from 3 up to 6 carbon atoms, with substantially a molar equivalent amount of a compound selected from the group consisting of chlorine and bromine in a reaction-inert organic solvent medium to form an α-haloketone and hydrogen halide.

(2) Reducing the hydrogen halide content of the reaction mixture of (1) to an amount such that a molar equivalent amount of o-phenylenediamine is soluble therein.

(3) Introducing under an inert atmosphere substantially a molar equivalent amount of o-phenylenediamine into the reaction mixture of (2) above and maintaining resulting mixture under an insert atmosphere and under conditions whereby said o-phenylenediamine and said α-haloketone condense.

(4) Adding to the reaction mixture of (3) an oxidizing agent which is miscible with said reaction-inert organic solvent medium and is selected from the group consisting of peroxycarboxylic acids and aqueous hydrogen peroxide, the temperature of reaction mixture being maintained throughout below about 50° C., until formation of quinoxaline-N,N'-dioxide is substantially complete.

By "cumulative, continuous flow procedure" is meant a multi-step synthetic procedure wherein each subsequent step is performed without isolation of the product of the preceding step, i.e., the successive reactions are run merely by adding the required reagents to the preceding reaction mixture.

The products of the instant process may be isolated and purified, and they may also be subjected to further chemical conversions without isolation.

Preferred embodiments of the instant invention are those wherein the substrate ketone is selected from the group consisting of cyclohexanoe, cyclopentanone, acetone, and methyl ethyl ketone, resulting in the formation of 1,2,3,4 - tetrahydrophenazine - N,N' - dioxide, 2,3-trimethylenequinoxaline-N,N'-dioxide, 2-methylquinoxaline-N,N'-dioxide and 2,3-dimethylquinoxaline-N,N'-dioxide, respectively. The products of the instant process possess potentially useful antibacterial activity and are chemical intermediates from which other useful antimicrobial agents are synthesized.

It has been indicated above that overall yield of quinoxaline-N,N'-dioxides obtained by the cumulative, continuous flow process of the instant invention is unexpectedly greater than the yield obtained by conducting the same series of reactions in a stepwise manner. Some beneficial effect on the overall yield might be expected, because the loss of intermediates during the prior art isolation steps is avoided by the instant invention. However, one skilled in the art would also expect this effect to be cancelled and a net decrease in overall yield to be observed in the instant process because it carries forward byproducts of each reaction into the next reaction step, a feature which would be expected to interfere with the formation of the desired products. The concentration of these by-products increases in geometrical progression, so that in a multi-step process a substantial decrease in an overall yield is the normally expected result. Unexpectedly, however, there is no such difficulty encountered in the present process, and, instead of a decrease in yield of final product, a substantial increase in yield is realized.

Detailed description of the invention

The first step of the instant process is the formation of an α-haloketone of the formula $$R_1-CH(X)-C(:O)-R_2$$

wherein $R_1$ and $R_2$ are as aforesaid and X is chlorine or bromine. Since a monohalogenated ketone is desired, certain appropriate precautions, known to those skilled in the art, should be observed. Among these precautions is the use of a reaction-inert organic solvent, such as benzene, toluene, carbon tetrachloride and other chlorinated hydrocarbons, tetrahydrofuran, ansul ether and acetic acid. A stoichiometric quantity of halogen should be used. A lesser amount will decrease the yield of desired haloketone, and a greater amount will result in the formation of a polyhalogenated product.

The rate of addition of the halogen to the reaction mixture should be appropriate to the preparation of a monohalogenated product. Since rapid addition of halogen will result in a local excess of the halogen in the reaction medium, it is obvious to one skilled in the art that a relatively slow rate of addition will be beneficial in the instant process. It is desirable to add the halogen at a rate no greater than the rate of formation of the haloketone so as to avoid a local excess of halogen and to minimize the tendency of polyhalogenation. Of course, the rate of reaction will be dependent upon the reaction temperature, which is limited by the freezing and boiling points of the solvent. A relatively low reaction temperature should be accompanied by a slow rate of addition, while a higher reaction temperature can accommodate a comparatively faster rate of addition. It is to be noted, however, that use of a relatively high reaction temperature may tend to favor formation of a polyhalogenated product. Also, agitation of the reaction mixture during addition of the halogen, by conventional methods of stirring or shaking, may be a desirable means of avoiding local excess of halogen.

The second step of the instant process is the condensation of the resulting α-haloketone with o-phenylenediamine. However, it has been found that merely adding said diamine to the halogenation reaction medium will not always result in a substantial or acceptable yield of the condensation product. Hydrogen halide is a by-product of the halogenation reaction, and it may be present in the reaction mixture in sufficient quantity to cause the diamine to precipitate out of solution as hydrochloride of hydrobromide salts.

The difficulty can be avoided by using acetic acid or other polar system as the solvent medium, since the hydrohalide salt will be soluble in such media. If a less polar solvent is used, in which the salt is insoluble or only partially soluble, then a quantity of said resulting hydrogen halide should be removed from the system prior to the addition of said o-phenylenediamine. It is not necessary that all traces of the hydrogen halide be removed, but only enough so that the amount of any diamine hydrohalide salt formed should not substantially exceed its solubility limits. Thus, the less polar the solvent, the greater the amount of hydrogen halide which should be removed for optimum results.

Removal of hydrogen halide can be effected by several means. As will be discussed hereinafter, the condensation reaction is preferably conducted under an inert atmosphere. Therefore, removal of the hydrogen halide is easily and conveniently accomplished by passing through the reaction mixture a reaction-inert gas, which may then be used to constitute the inert atmosphere. If the inert atmosphere is largely comprised of nitrogen, or a similar unreactive gas, then the bubbling of this gas through the medium is a particularly desirable means of removing the hydrogen halide.

When the solvent is not acetic acid or other carboxylic acid, hydrogen halide removal can be accomplished by neutralization. The reaction mixture can be passed through a basic ion exchange resin or an appropriate basic material can be added to the mixture. Especially effective are sodium carbonate, sodium bicarbonate, calcium carbonate, and the like. Additional basic materials which may be used are bisic organic substances such as pyridine and triethylamine. Indeed, an excess of said o-phenylenediamine can be used, but, of course, this is not a preferred reagent for neutralization in the instant process since less expensive reagents are available. When an organic base is used, preferably in an amount not more than equivalent to the amount of hydrogen halide present, it can be added to the mixture after the halogenation reaction is complete, or if added during the course of the halogenation reaction, it should be added at a rate slower than the rate of formation of the hydrogen halide.

As indicated hereinbefore, the condensation of the α-haloketone with o-phenylenediamine is preferably conducted under an inert atmosphere, such as nitrogen, carbon dioxide, or other gas which is inert to the reaction system. This atmosphere is preferably established prior to the addition of the diamine to the reaction mixture. It is desirable to add the diamine in a controlled manner, at a rate such that the temperature of the mixture does not become unduly elevated; it is usually preferred to maintain the temperature not above about 30–50° C.

It is highly desirable to add just one molar equivalent amount of the diamine to the reaction medium. Addition of a lesser amount will decrease the maximum possible yield of the condensation product and any excess added beyond the amount of α-haloketone present could interfere with subsequent reactions.

Following the addition of o-phenylenediamine to the reaction mixture, the condensation reaction is allowed to proceed to substantial completion before continuing with the next step of the instant process. The progress of the condensation reaction can be monitored by following the rate of consumption of o-phenylenediamine; aliquots are withdrawn from the mixture at certain time intervals and the quantity of diamine contained therein is determined by any one of a variety of analytical techniques. Among the suitable techniques are thin layer and gas-liquid phase chromatography and ultraviolet spectroscopy. The reaction will always proceed to completion within about 24 hours, during the course of which time it may be desirable to stir the mixture and maintain the temperature at about 30–60° C., preferably at about 50° C.

The final step of the instant invention is the conversion of the condensation product to a quinoxaline-N,N'-dioxide. This conversion is accomplished by oxidation with an oxidizing agent selected from the group consisting of peroxycarboxylic acids and aqueous hydrogen peroxide. Of course, said oxidizing agent must be miscible with the solvent system being used in order to achieve an efficient conversion. Therefore, aqueous hydrogen peroxide is preferably used only when acetic acid or a comparably water miscible solvent system is used. Among the common peroxycarboxylic acids which would ordinarily be used in the instant process are peracetic acid, perbenzoic acid and m-chloroperbenzoic acid. Peracetic acid is the preferred reagent.

For maximum yields, the addition of the oxidizing agent to the reaction system should be done in a carefully controlled manner, with rate of addition as slow as is necessary to maintain the reaction temperature below about 50° C., and preferably below about 40° C., during said addition. Since the first of the oxidation steps is highly exothermic, it will often be necessary to add the reagent in a dropwise manner, with prior and concurrent cooling of the reaction mixture. Stirring, both during and after the addition, may also be beneficial.

It is to be noted that any excess of o-phenylenediamine present in the mixture subsequent to the condensation reaction will react very rapidly and vigorously with the oxidizing agent, thus making the control of temperature more difficult and interfering with the progress of the desired oxidation reaction. For these reasons, an excess of o-phenylenediamine is preferably avoided, but to the extent that it is not avoided, a corresponding excess of oxidizing agent should be added.

Since a dihydroquinoxaline is the product of the hereinbefore discussed condensation reaction, normally a 3 molar equivalent amount of oxidizing agent is required to complete the desired conversion. One molar equivalent amount is necessary for each of the three successive oxidation steps, i.e., from the dihydroquinoxaline to the quinoxaline to the N-oxide to the N,N'-dioxide. However, it is known that the dihydroquinoxaline undergoes a facile oxidation to the quinoxaline, and to the extent that this oxidation occurs prior to the addition of said oxidizing agent, only 2 molar equivalents of oxidizing agent are required. Thus, it is seen that the amount of oxidizing agent required is equal to 3 molar equivalents for each molar equivalent of dihydroquinoxaline present in the reaction mixture, plus 2 molar equivalents for each molar equivalent of quinoxaline present. Under certain circumstances, it may be desirable to induce this first oxidation step by passing oxygen through the mixture after the condensation reaction is complete; in this way it may be possible to reduce the amount of oxidizing agent required. The amount of quinoxaline present in the mixture relative to the amount of dihydroquinoxaline present can be determined by the analytical techniques enumerated hereinbefore, and in this way, the amount of oxidizing agent required can be ascertained. Upon addition of the required amount of oxidizing agent, the reaction is allowed to proceed to completion with the temperature maintained below about 50° C., and preferably below about 40° C. Stirring may be desirable. The reaction is considered complete when a further production of quinoxaline-N,N'-dioxide substantially ceases, which will occur within about 24 hours.

Isolation of the quinoxaline-N,N'-dioxide product can be accomplished by means generally familiar to those skilled in the art. In some cases, addition of an excess of water will cause the product to precipitate, so that recovery is accomplished by simple filtration. Solvent removal and extraction are also suitable methods.

The products of the instant process antibacterial activity. Either as individual therapeutic agents or as mixtures of therapeutic agents, they may be administered along but are generally administered with a pharmaceutical carrier selected on the basis of the chosen route of administration and standard pharmaceutical practice. For example, they may be administered orally in the form of tablets or capsules containing such excipients as starch, milk sugar or certain types of clay, etc. They may be administered orally in the form of elixirs or oral suspensions which may contain a coloring or flavoring agent. They may be injected parenterally and for this use they may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The physician or veterinarian will determine the dosage which will be most suitable for a particular application and it will generally depend on the age, weight, degree of infection and other factors of a particular patient. It will generally be found that when a drug is administered orally a larger quantity will be requirred to produce the same anti-infection effect as a smaller quantity given parenterally. The compounds are useful in the same manner as other antimicrobial agents and the dosage level is of the same order of magnitude as is generally employed with these other antimicrobial agents. For a particular application it may be found that because of their high order of activity smaller dosages of the compounds of this invention are required to bring about the same effect as other and less active anti-infective agents.

The compositions of this invention may take a variety of forms. Various diluents may be employed and the percentage of active ingredients may be varied. It is necessary that the active ingredients form a proportion of the composition such that a suitable dosage form will be obtained. Obviously several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The composition may contain 10, 50, 75, 95 or an even higher percentage by weight of the active agent. Dosage unit forms may be prepared with a minor proportion of the carrier and a larger proportion of active materials and vice versa.

In addition, the instant products may be transformed, by means known to those skilled in the art, to other useful chemotherapeutic agents. The following references describe many of the products which may be synthesized from the instant compounds: U.S. Patent 2,891,062 (June 16, 1959); U.S. Patent 2,626,259 (Jan. 10, 1953); Belgium Patent 662,656; McIlwain, J. Chem. Soc. 322 (1943); and Wielding, Acta Pathol. et Microbial. Scand. 22, 379 (1945).

The following examples are given to more fully illustrate the instant invention. They are not the only possible embodiments of the invention and are not to be construed as a limitation on the scope thereof.

EXAMPLE I 1,2,3,4-tetrahydrophenazine-N,N'-dioxide

A solution of cyclohexanone (19.6 g., 0.2 mole) in 250 ml. of chloroform was cooled to 0–5° C., and a solution of chlorine (14.0 g., 0.2 mole) in 100 ml. chloroform was added, thereto dropwise, with stirring, over a period of one hour. Following the addition of chlorine, nitrogen was passed through the solution for 15 minutes. A chloroform solution of o-phenylenediamine (21.6 g., 0.2 mole) was then added, under nitrogen, over a period of one hour, with the temperature maintained below about 50° C. The reaction mixture was stirred under nitrogen, at room temperature, for an additional 24 hours. To the reaction mixture was then added a solution of 85% m-chloroperbenzoic acid (123 g., 0.6 mole) in 300 ml. of chloroform. The reaction temperature was maintained below 50° C. during the addition by adjusting the rate of addition and using an ice bath. After stirring for 24 hours at room temperature, the reaction mixture was filtered and washed with 5% aqueous sodium hydroxide and the desired product, 1,2,3,4-tetrahydrophenazine-N,N'-dioxide, recovered by removal of solvent and crystallization from chloroform/hexane.

EXAMPLE II 2,3-trimethylenequinoxaline-N,N'-dioxide

A solution of cyclopentanone (16.8 g., 0.2 mole) in 100 ml. of glacial acetic acid is cooled to 10° C., and a solution of bromine) 32 g., 0.2 mole) in 100 ml. of glacial acetic acid is added thereto dropwise, with stirring, over a period of one hour. A temperature of less than 20° C. is maintained throughout the addition. Following the addition of bromine, nitrogen is passed through the solution for 30 minutes. An acetic acid solution of o-phenylene-diamine (21.6 g., 0.2 mole) is then added, under nitrogen, over a period of 30 minutes, with the temperature maintained about 15° C. and 25° C. The reaction mixture is then stirred under nitrogen for an additional 12 hours. To the reaction mixture is then added in dropwise manner a solution of 30% hydrogen peroxide (68 g., 0.6 mole) with the rate of addition adjusted to maintain the temperature below about 50° C. The reaction mixture is then allowed to stand for 12 hours after which time it is poured into an excess of ice water and extracted with methylene chloride. The desired product, 2,3-trimethylenequinoxaline-N,N'-dioxide, is isolated from the methylene chloride solution by evaporation and crystallized from methylene chloride/hexane.

EXAMPLE III 2,3-dimethyl-N,N'-dioxide

Methyl ethyl ketone (7.2 g., 0.1 mole) was dissolved in 100 ml. of benzene and sodium carbonate (20 g.) added to the stirred mixture, which was then cooled to about 10° C. A solution of bromine (16 g., 0.1 mole) in 100 ml. of methylene chloride was then added dropwise, with stirring, over a period of one hour. The temperature was maintained below about 30° C. during the addition. Under an atmosphere of nitrogen, a solution of o-phenylenediamine (10.8 g., 0.1 mole) in 100 ml. of methylene chloride was then added and the reaction mixture stirred for 12 hours, the temperature being maintained at about 25° C. throughout. The mixture was then refluxed for an additional one hour, after which time it was then filtered and 40% peracetic acid (57 g., 0.3 mole) was added dropwise over a period of two hours, with the temperature maintained throughout at less than 40° C. Addition of excess water caused separation of methylene chloride/benzene solution, from which the product, 2,3-dimethylquinoxaline-N,N'-dioxide was recovered by evaporation.

EXAMPLE IV 2-methylquinoxaline-N,N'-dioxide

Acetone (5.8 g., 0.1 mole) is dissolved in 100 ml. of benzene and sodium carbonate (20 g.) added to the stirred mixture, which is then cooled to about 10° C. A solution of chlorine (7.1 g., 0.1 mole) in 100 ml. of methylene chloride is then added dropwise, with stirring, over a period of one hour, with the temperature maintained below about 30° C. during the addition. Under an atmosphere at nitrogen, a solution of o-phenylenediamine (10.8 g., 0.1 mole) in 100 ml. of methylene chloride is then added and the reaction mixture is stirred for 12 hours, the temperature being maintained below 50° C. throughout. The mixture is then refluxed for an additional one hour, after which time it is filtered and 40% peracetic acid (57 g., 0.3 mole) added dropwise thereto over a period of two hours, with the temperature maintained throughout at less than 40° C. Addition of excess water causes separation of the methylene chloride solution, from which the product, 2 - methylquinoxaline-N,N'-dioxide is recovered by evaporation.

EXAMPLE V 2-hexyl-3-phenyl-quinoxaline-N,N'-dioxide

A solution of benzyl hexyl ketone (40.8 g., 0.2 mole) in 100 ml. of glacial acetic acid is cooled to 10° C., and a solution of bromine (32 g., 0.2 mole) in 100 ml. of glacial acetic acid is added thereto dropwise, with stirring, over a period of one hour. A temperature of less than 20° C. is maintained throughout the addition. Following the addition of bromine, nitrogen is passed through the solution for 30 minutes. An acetic acid solution of o-phenylenediamine (21.6 g., 0.2 mole) is then added, under nitrogen, over a period of 30 minutes, with the temperature maintained between about 15° C. and 25° C. The reaction mixture is then stirred under nitrogen for an additional 12 hours. To the reaction mixture is then added in dropwise manner a solution of 40% peracetic acid (144 g., 0.6 mole), with the rate of addition adjusted to maintain the temperature below about 50° C. The reaction mixture is then allowed to stand for 12 hours after which time it is poured into an excess of ice water and extracted with methylene chloride. The desired product, 2-methylquinoxaline-N,N'-dioxide, is isolated from the methylene chloride solution by evaporation.

EXAMPLE VI 2-phenylquinoxaline-N,N'-dioxide

A solution of acetophenone (24 g., 0.2 mole) in 250 ml. of chloroform is cooled to 0–5° C., and a solution of chlorine (14.0 g., 0.2 mole) in 100 ml. of chloroform is added thereto dropwise, with stirring, over a period of one hour. Following the addition of chlorine, nitrogen is passed through the solution for 15 minutes. A chloroform solution of o-phenylenediamine (21.5 g., 0.2 mole) is then added, under nitrogen, over a period of one hour, with the temperature maintained below about 50° C. The reaction mixture is stirred continually under nitrogen, at room temperature, for an additional 24 hours. To the reaction mixture is then added a solution of 85% m-chloroperbenzoic acid (123 g., 0.6 mole) in 300 ml. of chloroform. The reaction temperature is maintained below 50° C. during the addition by adjusting the rate of addition and using an ice bath.

After stirring for 24 hours, the reaction mixture is filtered and washed with 5% aqueous sodium hydroxide and the desired product, 2-phenylquinoxaline - N,N' - dioxide, is recovered by removal of solvent and crystallization from chloroform/hexane.

EXAMPLE VII

The procedure of Example III is repeated wherein molar equivalent amounts of the following ketones are substituted for said methyl ethyl ketone:

Benzyl isobutyl ketone
Methyl β-phenylethyl ketone
Dihexyl ketone
Benzyl hexyl ketone.

What is claimed is:
1. The process which comprises conducting, as a cumulative, continuous flow procedure, the steps of:
(A) contacting, under monohalogenation conditions, a ketone of the formula

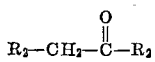

wherein $R_1$ is selected from the group consisting of hydrogen and alkyl containing from 1 up to 5 carbon atoms, $R_2$ is selected from the group consisting of alkyl containing from 1 up to 6 carbon atoms, phenyl, benzyl, and β-phenylethyl and $R_1$ and $R_2$, taken together, are polymethylene containing from 3 up to 6 carbon atoms, with substantially a molar equivalent amount of a compound selected from the group consisting of chlorine and bromine in a reaction-inert organic solvent medium to form an α-haloketone and hydrogen halide;
(B) reducing the hydrogen halide content of the reaction mixture of (A) to an amount such that a molar equivalent amount of o-phenylenediamine is soluble therein;
(C) introducing under an inert atmosphere substantially a molar equivalent amount of o-phenylenediamine into a reaction mixture of (B) above and maintaining resulting mixture under an inert atmosphere and under conditions whereby said o-phenylenediamine and said α-haloketone condense; and
(D) adding to the reaction mixture of (C) an agent which is miscible with said reaction inert organic solvent medium and is either aqueous hydrogen peroxide or a peroxycarboxylic acid oxidizing agent, the temperature of reaction mixture being maintained throughout below 50° C. until formation of quinoxaline-N,N'-dioxide is substantially complete.
2. The process of claim 1 wherein the reduction of hydrogen halide content of step (2) is effected by passing through said mixture a reaction-inert gas.
3. The process of claim 1 wherein the reduction of hydrogen halide content of step (2) is effected by neutralization.

4. The process of claim 1 wherein said o-phenylenediamine is added to said α-haloketone in step (3) at a temperature below about 50° C.

5. The process of claim 1 wherein said oxidizing agent of step (4) is peracetic acid.

6. The process of claim 1 wherein the temperature of said reaction mixture in step (4) is maintained below about 40° C. during the addition of said oxidizing agent.

7. The process of claim 1 wherein said ketone of step (4) is selected from the group consisting of cyclohexanone, cyclopentanone, acetone and methyl ethyl ketone.

8. The process of claim 1 wherein the ketone of step (1) is cyclohexanone, the reaction temperature of step (3) is maintained below about 50° C., said oxidizing agent of step (4) is peracetic acid and the reaction temperature of step (4) is maintained below about 40° C.

No references cited.

NICHOLAS S. RIZZO, Primary Examiner